Aug. 9, 1932. R. A. HEISING ET AL 1,870,682
DIRECTION INDICATING SYSTEM
Filed Jan. 5, 1924

Inventors:
R. A. Heising.
J. P. Kendall

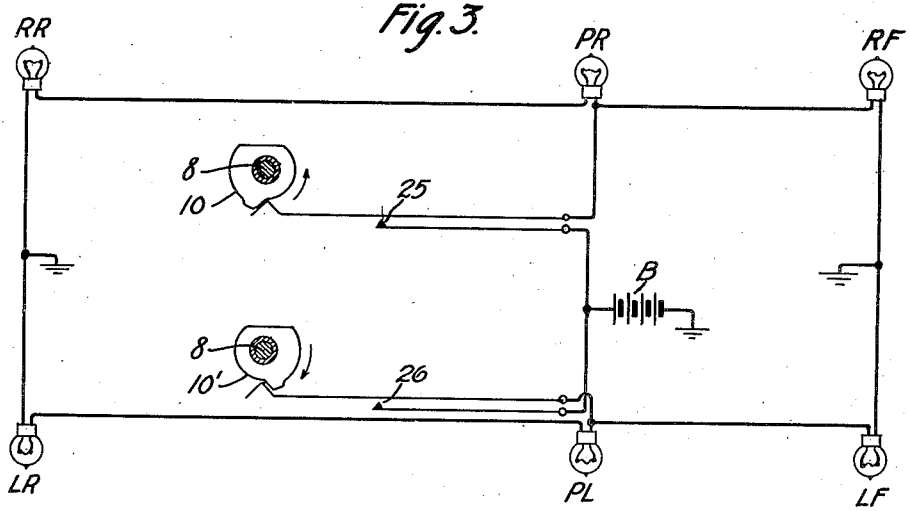
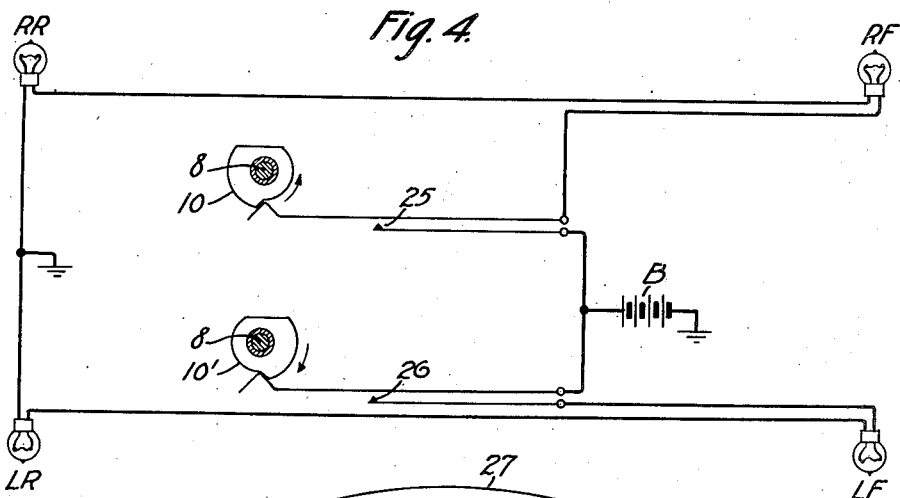
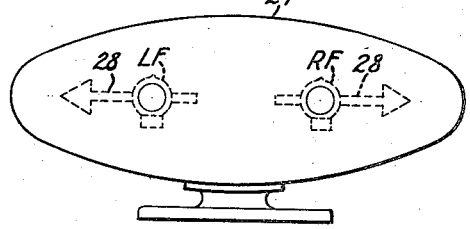

Patented Aug. 9, 1932

1,870,682

UNITED STATES PATENT OFFICE

RAYMOND A. HEISING, OF MILLBURN, AND JAMES P. KENDALL, OF CRANFORD, NEW JERSEY

DIRECTION INDICATING SYSTEM

Application filed January 5, 1924. Serial No. 684,593.

This invention relates to indicating systems and more especially to direction indicating systems for moving vehicles and devices constituting portions of such systems.

An object of the invention is to improve the operation of systems for the giving of an indication by the operator of the vehicle and subsequent withdrawal of the indication after the expiration of a predetermined time without further attention on the part of the operator. An important feature is that the operator may give the indication in such a manner that it will be withdrawn in less than the maximum predetermined time.

A further object is to provide indicator means whereby the driver of a vehicle such as an automobile, for example, may be visually or otherwise notified that a signal on the rear of his vehicle which is intended to give notice, to the driver of a following vehicle, of his intention to drive in a particular manner, is operating properly. A further object is to provide a visually indicating device which cannot give an indication to the driver that his signal is operating properly unless it is so operating.

Other objects are to simplify systems, such as described above, to reduce the number of separate lamps and the number of kinds of lamps necessary in such systems, to reduce the drain on batteries used to energize the lights of such systems, and to provide for more positive, certain, and effective operation.

The invention is exemplified in one embodiment thereof by an arrangement adapted to give on an automobile simultaneous front and rear indications of the direction about to be taken by the driver. A movable element arranged adjacent to the driver is actuated to the right or to the left to indicate his intention to turn in the corresponding direction. A signal holding mechanism functions to maintain the indication for a desired predetermined time, for example 10 seconds, after the expiration of which the movable element is restored to normal and the signal withdrawn without further attention on the part of the operator. However, the operator may at any time cancel an indication once given or give an indication of his intention to turn in the opposite direction regardless of whether the signal holding mechanism has operated to withdraw the original indication. Furthermore, a signal may at any time be repeated after which it will be maintained for an additional time equal to the desired predetermined time unless sooner canceled. An escapement mechanism controls the time of holding the signal. During the operation of the movable element, a pilot signal placed before the operator flashes intermittently, thus indicating that the rear signal light is not burned out or for some other reason is inoperative. The pilot light flashes also at the beginning and at the end of each signal indication. The pilot signal is arranged in series with the rear signal light.

In a modified form, the pilot light does not flash but is lighted during the entire time of giving the indication.

In another modified form, front signal lights are provided with transparent or translucent openings, such as colored glass, so arranged that the driver can observe whether they are operating. By placing the front signals in series with the rear signals the front signals serve as pilot lights for the rear signals.

The invention will be more perfectly understood by reference to the following description having reference to the attached drawings, wherein:

Fig. 3 is a similar arrangement employing separate left and right hand non-flashing pilot lights;

Fig. 4 is a modified form in which the front signal lights serve as pilots for the rear signal lights; and Fig. 5 is a rear elevation of a form of casing which may enclose the front signal lights in such a system as Fig. 4 but which may also be used in connection with such systems as Figs. 2 and 3 or other similar systems.

Figure 1:
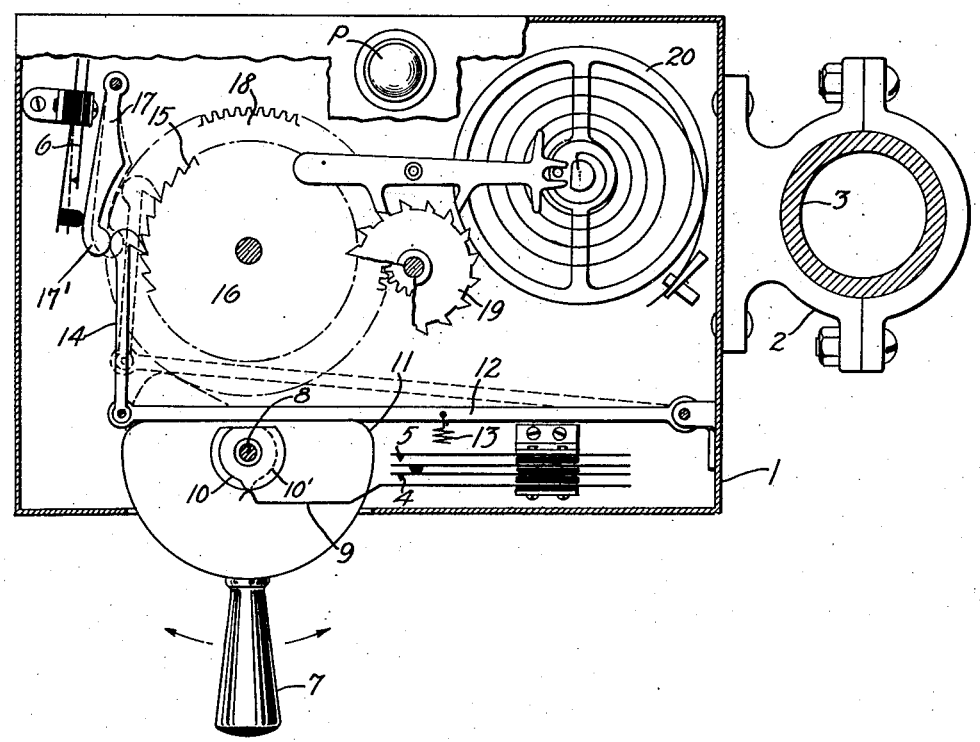
Fig. 1 is a partly cross sectional plan view of the parts of a control device for the signal lights of an automobile.

In Fig. 1 is shown a casing 1 containing the operative mechanism. The casing is provided with a clamp 2 to fasten it to the steering post 3. The contacts 4 and 5 for the right hand signal lights are shown, contact 4 controlling the rear light and contact 5 the front light. The contacts for the left hand lights are immediately under the contacts 4 and 5 and are not shown in Fig. 1. Contact 6 controls the pilot light. The function of the other elements are to open and close the contacts in order to cause the signals to function properly. When the driver desires to give an indication that he desires or intends to turn to the right, the finger piece 7, which is pivoted at 8, is turned to the right. The spring 9 then rides along the depressed portion of the cam shaped surface 10 and closes contacts 4 and 5. When finger piece 7 is operated, the cam surface 11 causes the lever 12 to be depressed to the dotted line position against the tension of spring 13. The shoulder or knob 17' on lever 17 maintains contact 6 open at the beginning of movement. Before contact 6 is closed, contacts 4 and 5 are closed thus causing the pilot light P to flash. If the knob 17' is omitted, the pilot light P will not flash just before withdrawal of the signal. The pawl 14 then rides along the teeth 15 of the circular ratchet 16. Each time the pawl 14 falls into a depression between the teeth, the pivoted arm 17 moves to dotted line position and causes a momentary closure of contact 6. When the bar 12 is fully depressed and the finger piece 7 released, the pawl 14 engages the rear surface of the last tooth over which it has passed. The toothed wheel 18 is rigidly attached to the ratchet wheel 16, these being rotatable on a suitably mounted axis or shaft. The tension of spring 13 then causes wheel 18 to rotate. Its rotation is controlled by the escapement mechanism to which it is geared by a suitable speed reducing mechanism which may be of any desired number of intercoupled gears and pinions but is in the present instance illustrated as a single pinion attached to the escapement ratchet and geared to the wheel 18. After several oscillations of the balance wheel 20, the lever 12 returns to normal and opens contacts 4 and 5. Before opening contacts 4 and 5, the contact 6 is opened, thus causing the pilot lamp P to flash. The escapement mechanism and balance wheel may be constructed to regulate the time required for the lever 12 to return to normal position as may be desired. The balance wheel and balance wheel spring may be made adjustable, in accordance with well known methods, to regulate the natural period of the balance wheel but ordinarily this will not be required. By correct design, the period may be such that no adjustment will be required. The cam surface 10' controls contacts 4' and 5' which do not appear in Fig. 1 as they are below the contacts 4 and 5, but are shown in Fig. 2.

Figure 2:
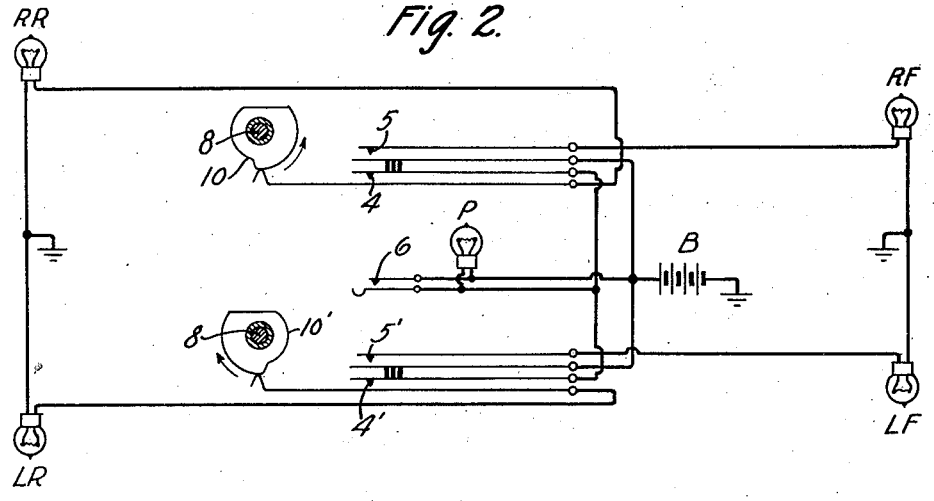
Fig. 2 is a circuit diagram of a system including front and rear lights and a flashing pilot light in circuit with the rear lights.

By reference to the circuit diagram of Fig. 2, the mode of operation will be traced out in greater detail. The shaft 8 which carries the cam shaped members 10 and 10' is shown in two places in Fig. 2 in order to simplify the circuit. The right rear signal light RR and left rear signal light LR are controlled by contacts 4 and 4' respectively. The right and left front lights RF and LF are controlled by the contacts 5 and 5'. When the driver wishes to signal a turn to the right, the handle 7 is turned to the right. Contacts 4 and 5 are closed at the beginning of motion of handle 7. A circuit is then closed through contact 6 or lamp P and lamp RR to ground. As the pawl 14 moves over teeth 15, it opens contact 6 once for each tooth and puts pilot lamp P in circuit. Lamp P is of sufficiently low current, or current and voltage that it flashes each time contact 6 is opened. This apprises the driver that the lamp RR is operating properly. If lamp RR is burned out, the pilot or indicator lamp P does not light. If there should be an accidental ground between lamp P and lamp RR, the lamp P will glow with such unusual brightness as to attract the operator's attention or more probably will burn out at once and thus indicate to him that something is wrong. In either case, the operator will be immediately apprised that the rear signal light RR is not functioning properly. Pilot lamp P is preferably positioned within a recess in the casing 1 (Fig. 1) and may be covered with a red, green or other colored glass. When switch contact 4 is closed, the contact 5 is also closed, thus closing a circuit from battery B through front signal light RF which serves to apprise a traffic officer or other person in front of the vehicle that the direction in which the driver proposes to turn is to the left.

The operation for lighting the left rear and front signal lights LR and LF is the same as that just described except that the handle 7 is turned to the left and contacts 4' and 5' are closed. The pilot light operates the same in either case. An indication once given is maintained for the period of time required for the escapement mechanism to allow lever 12 and handle 7 to return to normal and open contacts 4, 5 or 4', 5' as the case may be. However, the operator can at any time withdraw the indication given, by restoring handle 7 to its central position or he may give the opposite indication by turning the handle 7 in the opposite direction. Furthermore, although the maximum duration of an indication is controlled by the device, the driver can at any time repeat the indication. Furthermore, the driver can, if he desires, give an indication which will automatically be withdrawn in less than the maximum time. This is done by turning the handle only part way so that the pawl 7 will pass over less than the full number of teeth and the lever 12 will be depressed less than the full distance. The method of operation usually preferred will be to depress the lever 12 to the full extent of its motion but a less depression and a consequently shorter duration of signal may sometimes be desirable.

In Fig. 3 separate pilot lights PR and PL are shown for each rear signal light. Each pilot light is connected in series with the corresponding signal light. The front signal lights RF and LF are in a separate shunt circuit, controlled, however, by the contacts 25 and 26. The front lights in this arrangement must withstand the total voltage impressed across the rear and the pilot lamps in series.

The cams 10 and 10' are formed differently in Fig. 3 so that the tension of the spring will cause it to bear against the shoulders upon the cams in such a manner as to prevent jars or light pressure from displacing the lever 7 and giving a false or undesired indication. Sufficient pressure must be applied to the lever 7 to move the raised shoulder of the cam under the spring before an indication can be given.

From Fig. 4 the pilot lights are omitted, their function being performed by the front signal lights as will be described in connection with Fig. 5. Here again is a still further modified form of cam well adapted to prevent false indications.

Fig. 5 shows the rear of one form of housing or container 27 for the front signal lights. In the rear of this housing and just back of each front signal light is an opening 28 preferably covered with colored glass or other translucent material so as to visually indicate to the operator or persons having a view of the openings 28 that the signal lights are working properly. When the front lamp is lighted in such a circuit as Fig. 4 where the corresponding front and rear lights are in series this is a positive indication that the rear lights are also functioning properly. The housing for the front lights may be of any suitable size or shape or separate housings for each light may be used. Such a housing as that of Fig. 5 may be used in connection with such circuits as those of Figs. 2 and 3 and thus furnish an additional check upon the operativeness of the signaling system as well as a positive indication that the front lights are in good order and that the time controlled signal withdrawing apparatus is functioning properly.

The arrangement of Fig. 5 may thus be used with any desired circuit. The forms of cam and the contact and lamp arrangements of Figs. 2, 3 and 4 are interchangeable and, of course, many other forms of cams and escapement and other mechanisms may be designed to carry out the objects of the invention.

Furthermore, it is obvious that the system of Fig. 2 may be designed and operated with the contact 6 omitted or permanently left open, although its use offers advantages of some importance in saving battery power and producing a pilot signal adapted to impress itself upon the attention.

From the foregoing, it is seen that the invention provides for certainty and positive operation of signals, provides a certain indication by which the operator or persons riding with him are enabled in case of accident to say that the signals were in working order, provides for changing, withdrawing, and regulating the duration of signals, all with minimum attention on the part of the operator. A signaling operation on the part of the operator consists in a single motion of the finger, thumb, or hand in practically a straight line to operate the finger piece 7.

What is claimed is:

1. A direction indicating system comprising "left turn" and "right turn" indicating means, a single element of which the direction of movement serves for selectively actuating said means, and means operating at a fixed rate with respect to time functioning in a time determined by the extent of operation of said element for canceling the indicating effect of the actuation of either of said indicating means.

2. An indicating system for vehicles comprising right and left signal lights, a finger piece actuated to the right to light said right signal light and to the left to actuate said left signal light, in combination with an oscillatory spring controlled balance wheel and other means effective in cooperation with said wheel to restore said finger piece to its central position at the expiration of a predetermined time after its actuation.

3. In a right and left direction indicating system, a pivoted member, a lever adapted to be depressed by a cam portion of said member, a toothed wheel, a pawl pivoted on said lever and actuated thereby to slide over the teeth of said wheel, a pilot light, a contact for controlling the pilot light, means for closing said contact once for each tooth passed over by said pawl, delayed action control means restraining the rotation of said wheel, a spring for restoring said pawl and lever and actuating said delayed action means, and right or left hand contacts adapted to be closed at the beginning of the depression of said lever and to remain closed until the restoration thereof.

4. In a direction indicating system, a right hand signal light, a left hand signal light, means for selectively closing the circuit of either of said lights, a pilot light connected in series with whichever of said lights is in circuit, a short circuit around said pilot light, and means actuated by the action of the circuit closing means for intermittently opening said short circuit during at least a portion of the time either of said signaling lights are in circuit.

5. In a rear light direction indicating system, a circuit including a rear light and energizing means therefor, a pilot light, means for closing said circuit, and means for causing said pilot light to give at least one short flash during the actuation of said circuit closing means to indicate the operativeness of said rear light, said last named means functioning in cooperation with other means to cause said pilot light to remain unlighted during the period of time after completion of the operation of the means for closing said circuit and the extinguishment of the rear light.

6. A signal light, movable means to close a circuit therethrough, time controlled circuit opening means for said circuit, a pilot light, and means to cause said pilot light to flash during the actuation of said movable means but not during the time of operation of said time controlled means until just before the end thereof.

7. In a control device for movement indicating signaling systems, an operating element capable of a signal establishing movement, an electrical open circuit controlled by said element, means whereby said open circuit is closed by a signal-establishing movement of said element and remains closed until the restoration of said element, and an auxiliary circuit with means whereby said auxiliary circuit is opened temporarily during the signal-establishing movement of said element, said last named means being in cooperative relation with an additional member whereby said auxiliary circuit is held closed during the movement which restores said element after a signal-establishing movement.

8. A plurality of signaling lights, a vibratory escapement mechanism, an operating member mounted to be movable in a corresponding plurality of directions of motion, means operative in accordance with a direction of motion imparted to said member to select a circuit and control the selected circuit to energize one of said lights and energy storing means moved by motion of said member to store energy to operate said mechanism, and means controlled by and functioning after a predetermined duration of operation of said mechanism to control the selected circuit to deenergize whichever of said lights is energized.

9. Signal light mechanism comprising a signal light and a pilot light, a controlling element, a cam mounted to be operated by said controlling element, a set of contacts, said cam controlling said set of contacts for controlling the energization of said signal light, pawl and ratchet mechanism actuated by said controlling element, and a contact controlled by said pawl and ratchet mechanism to control the energization of said pilot light.

10. A combination in accordance with claim 9 in which said ratchet mechanism is movable to deenergize said signal light, a spring tensioned by said controlling element controls the movement of said ratchet mechanism, and time delay mechanism controls the speed of movement of said ratchet mechanism.

11. In a direction indicator system for vehicles, a signal mounted for display on a part of the vehicle which is invisible to the operator, means for placing said signal in a signaling condition, restoring means therefor, a lamp visible to the operator for indicating, means for causing said lamp to flash solely at the establishment of and at the end of said signaling condition, and connecting devices whereby said restoring means is set into operation by actuation of said means for placing said signal in signaling condition.

12. In a vehicle signaling system, a rear signaling light, a circuit therefor, circuit closing means therefor, additional means therefor operating under the control of a delayed action mechanism to open said circuit, a pilot lamp, circuit closing means to flash said pilot lamp, and means to actuate said last named circuit closing means to give a flashing indication at the beginning and ending of the closing of said circuit of said rear signaling light.

13. In a vehicle movement indicating signaling system, two separate signal lights, means including a single operating member designed and mounted to select in accordance with the direction of movement thereof to energize one or the other of said lights, a vibratory escapement mechanism, a spring for driving said escapement mechanism, said spring being tensioned by the actuation of said operating member, and means controlled by said escapement mechanism whereby said mechanism determines the duration of energization of whichever light is energized.

In witness whereof we hereunto subscribe our names this 2d day of January, A. D. 1924.

RAYMOND A. HEISING.
JAMES P. KENDALL.